Figure 1:
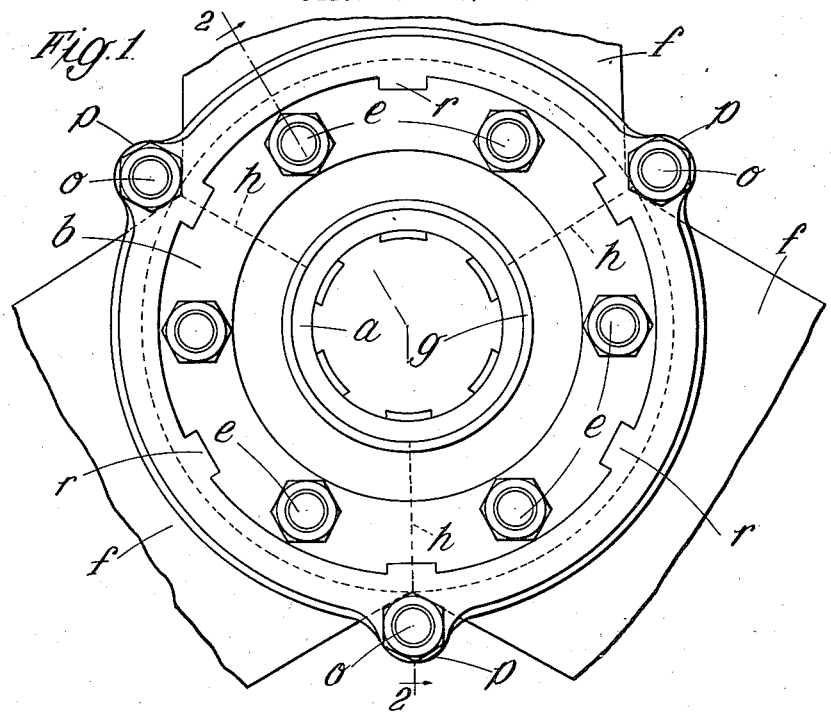

April 30, 1935.    A. G. FORSYTH    1,999,326

PROPELLER FOR AIRCRAFT AND FOR LIKE PURPOSES

Filed Nov. 28, 1934

ARCHIBALD GRAHAM FORSYTH
INVENTOR

ATTORNEYS

Patented Apr. 30, 1935

1,999,326

UNITED STATES PATENT OFFICE 1,999,326

PROPELLER FOR AIRCRAFT AND FOR LIKE PURPOSES

Archibald Graham Forsyth, Cheam, England, assignor to The Fairey Aviation Company Limited, Hayes, England Application November 28, 1934, Serial No. 755,124 In Great Britain November 25, 1933

3 Claims. (Cl. 170—173)

This invention relates to the mounting on a hub of the blades of a propeller for aircraft, boats, fans and the like. Although the invention will be described with reference to an airscrew, it is to be understood that it is not restricted thereto. The invention has for its object an improved construction which will enable such blades to be located accurately and to be secured rigidly with great facility. For this purpose, and in accordance with this invention, the blades of an airscrew have roots which are enlarged at both sides in the direction of the axis of rotation of the propeller and have inclined faces formed on said enlargements. These roots are received in correspondingly formed recesses in the hub. The walls of each recess which overhang the root therein are formed to converge towards the axis of the airscrew blade while the corresponding faces of the root are similarly inclined. Means are provided for exerting a wedge action on said root by moving towards one another the parts on which said overhanging walls are formed, thus forcing the roots of the blades against the hub.

Preferably the roots of the blades are adapted to be clamped, without wedge action between two annular plates, one of which is fast, and the other of which is splined and slidable, on the hub, by bolts passing through the blade roots so as to draw together said plates. The overhanging walls are preferably constituted by separate rings, parts of the inner faces of which are conical, while parts are cylindrical, said rings being adapted to slide on the peripheries of said annular plates and to be drawn together by bolts passing through said rings (or lugs thereon) and through the spaces between adjacent blades. A screwed ring or the like may also be furnished for moving the slidable annular plate axially of the hub. This arrangement permits the blade roots to be assembled about the hub, roughly adjusted by the use of the bolts passing therethrough, and of said screwed ring, if provided, and then to be forced against said hub by the application, and tightening up of the bolts of the separate rings, after which the blade roots may be finally secured by tightening up the bolts which pass therethrough, and the screwed ring, if provided.

It is to be understood that the blade roots are shaped not only to abut against the hub but collectively to fill up the annular space between the fixed and slidable plates.

The improved arrangement is of particular advantage in connection with a three-bladed airscrew, and in the accompanying drawing one form of the invention is shown as applied to such an airscrew.

Figure 2:
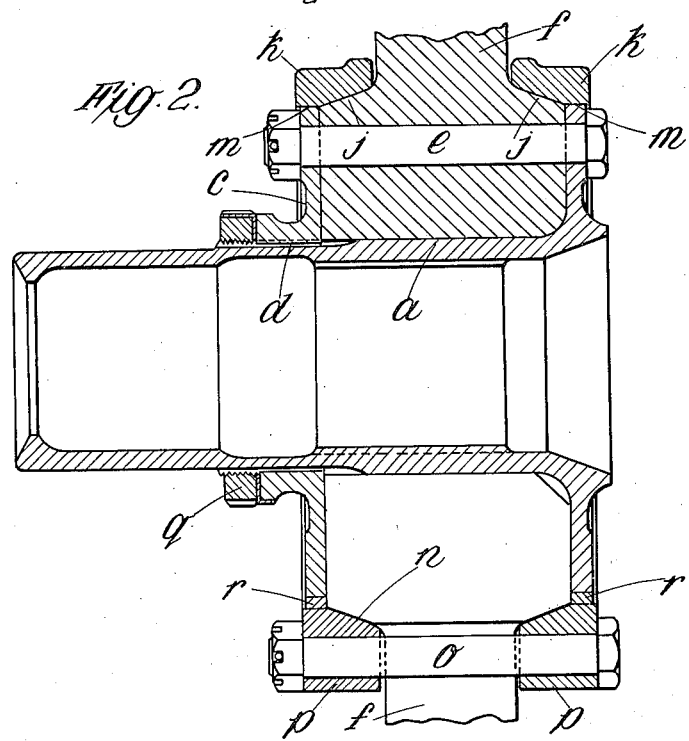

Figure 1 is an end view of the hub portion of the airscrew; and, Figure 2 is a section on the line 2—2 Figure 1.

In the drawing the reference character $a$ indicates the hub of the propeller which is furnished, at one end, with an annular plate $b$ fast thereon and with a second annular plate $c$ which is slidable thereon but is splined thereto as at $d$. These plates $b$ and $c$ are arranged to be drawn the one $c$ towards the other $b$ by bolts $e$ . . . which pass through said plates and through the roots of the propeller blades $f$ $f$ $f$. The roots are shaped not only to abut against the hub $a$ as at $g$ in Figure 1, but, collectively to fill up the annular space between the fixed and slidable plates $b$ and $c$, the meeting faces of the roots of the blades $f$ . . . being indicated by the broken lines $h$ $h$ $h$.

Further the roots of said blades are enlarged, in the direction of the axis of rotation of the propeller, as shown in Figure 2, and those faces $j$ $j$ of said enlarged roots which are remote from said axis converge towards the axes of the respective propeller blades. Rings $k$ $k$ have parts $m$ $m$ of their inner faces cylindrical and slidable on the peripheries of the plates $b$ and $c$ and parts $n$ $n$ conical to correspond with the faces $j$ $j$ of the enlarged propeller roots. Bolts $o$ . . . pass through lugs $p$ . . . on the rings $k$ $k$ and through the spaces between the propeller blades $f$ . . . and serve to draw together the rings $k$ $k$ so that coaction between the inclined faces $n$ $n$ of the latter and those $j$ $j$ of the enlarged roots of the propeller blades $f$ . . . causes said roots to be forced against the hub $a$. $q$ is a screwed ring threaded on the hub $a$ for moving the plate $c$ towards the plate $b$. The rings $k$ $k$ are splined to the plates $b$ and $c$ as shown at $r$ in order to take up the drive.

I claim:—

1. A propeller mounting assembly comprising a plurality of propeller blades having roots enlarged at both sides in the direction of the axis of rotation, the faces of each root farthest from the axis of rotation being inclined, a hub member, an annular plate secured to said hub member, a second annular plate keyed to said hub member and slidable on said hub member toward and away from said first annular plate, said plates being provided with aligned apertures adapted to align with apertures through the roots of the propeller blades when the same are placed between the plates, bolts passing through the aligned apertures in the plates and the roots to clamp the roots between the plates, annular rings slidable on the peripheries of said plates, said rings having walls overhanging the roots of the propeller blades which walls have inclined surfaces complementary to the inclined faces of the roots, said rings being provided with apertures adapted to align and receive bolts passing therethrough and through the spaces between adjacent blades, said rings being adapted to be drawn toward each other to force the roots of the blades against the hub member.

2. A propeller mounting assembly comprising a plurality of propeller blades having roots enlarged at both sides in the direction of the axis of rotation, the faces of each root farthest from the axis of rotation being inclined, a hub member, annular plates at least one of which is secured to said hub member, means to force the plates against the roots to clamp the same laterally and independently movable means upon the periphery of said plates adapted to clamp the roots against the hub member.

3. A propeller mounting assembly comprising a plurality of propeller blades having roots enlarged at both sides in the direction of the axis of rotation, the faces of each root farthest from the axis of rotation being inclined, a hub member, annular plates at least one of which is slidable upon said hub member, said plates being provided with apertures adapted to align with apertures in said roots when the same are placed between the plates, bolts passing through the aligned apertures in the roots and plates to clamp the roots between the plates, annular members slidable on the peripheries of said annular plates in the direction parallel to the axis of rotation, complementary means on said annular plates and said annular members adapted to prevent relative rotation, means to force the annular members toward each other, said annular members having walls overhanging the inclined faces of said roots adapted to engage the said inclined faces so as to force the roots against the hub member.

ARCHIBALD GRAHAM FORSYTH.